United States Patent
Byrne

(10) Patent No.: US 12,200,568 B1
(45) Date of Patent: Jan. 14, 2025

(54) METHODS AND SYSTEMS FOR AUGMENTING NETWORK SITES

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 396 days.

(21) Appl. No.: 17/365,760

(22) Filed: Jul. 1, 2021

(51) Int. Cl.
| | | |
|---|---|---|
| H04W 4/024 | (2018.01) | |
| G01C 21/36 | (2006.01) | |
| H04W 4/02 | (2018.01) | |
| H04W 4/40 | (2018.01) | |
| H04W 4/50 | (2018.01) | |
| H04W 24/08 | (2009.01) | |
| H04W 28/086 | (2023.01) | |
| H04W 88/08 | (2009.01) | |

(52) U.S. Cl.
CPC ........ *H04W 4/024* (2018.02); *G01C 21/3626* (2013.01); *H04W 4/023* (2013.01); *H04W 4/40* (2018.02); *H04W 4/50* (2018.02); *H04W 24/08* (2013.01); *H04W 28/0861* (2023.05); *H04W 88/08* (2013.01)

(58) Field of Classification Search
CPC . H04W 72/542; H04W 52/367; H04W 4/029; H04W 76/16; H04W 4/024; H04W 4/023; H04W 4/40; H04W 4/50; H04W 24/08; H04W 28/0861; H04W 88/08; G01C 21/3626; G01C 21/3602
See application file for complete search history.

(56) References Cited

U.S. PATENT DOCUMENTS

| | | | |
|---|---|---|---|
| 7,684,329 B2 | 3/2010 | Mohanty et al. | |
| 10,587,721 B2 | 3/2020 | Das et al. | |
| 2011/0274092 A1* | 11/2011 | Liu | H04W 52/367 370/335 |
| 2016/0270075 A1* | 9/2016 | Huang | H04W 76/16 |
| 2017/0127427 A1* | 5/2017 | Claridge | H04W 72/542 |
| 2018/0301034 A1* | 10/2018 | Morita | G01C 21/3602 |
| 2021/0281977 A1* | 9/2021 | Ebner | H04W 4/029 |

FOREIGN PATENT DOCUMENTS

JP      2014106209 A    *   6/2014

* cited by examiner

*Primary Examiner* — Vinncelas Louis
(74) *Attorney, Agent, or Firm* — Lee & Hayes, P.C.

(57) ABSTRACT

Methods and systems for determining an outage of the wireless communication services in an area are discussed herein. A method according to an implementation comprises determining a set of nodes providing wireless services; augmenting one or more capacities of at least one of the set of nodes; receiving, from a mobile device, a request for a data service associated with a throughput that meets or exceeds a threshold level; determining, based at least in part on a proximity of the mobile device, at least one candidate node from the set of nodes; sending, to the mobile device, an instruction that routes the mobile device to the at least one candidate node to receive the data service.

20 Claims, 7 Drawing Sheets

600

```
┌─────────────────────────────────────────────────────────┐
│ A COMPUTING DEVICE DETERMINES A SET OF NODES THAT PROVIDE│
│              WIRELESS SERVICES TO AN AREA                │
│                          602                             │
└─────────────────────────────────────────────────────────┘
                            │
                            ▼
┌─────────────────────────────────────────────────────────┐
│ THE COMPUTING DEVICE AUGMENTS ONE OR MORE CAPACITIES OF  │
│ THE SET OF NODES, THE ONE OR MORE CAPACITIES INCLUDING AT│
│ LEAST ONE OF A RADIO FREQUENCY (RF) CAPACITY, A BACKHAUL │
│         CAPACITY, OR A COMPUTING CAPACITY                │
│                          604                             │
└─────────────────────────────────────────────────────────┘
                            │
                            ▼
┌─────────────────────────────────────────────────────────┐
│  THE COMPUTING DEVICE RECEIVES A REQUEST FOR DATA SERVICE│
│                    FROM A MOBILE DEVICE                  │
│                          606                             │
└─────────────────────────────────────────────────────────┘
                            │
                            ▼
┌─────────────────────────────────────────────────────────┐
│ THE COMPUTING DEVICE DETERMINES A CANDIDATE NODE FROM THE│
│ SET OF NODES TO PROVIDE THE DATA SERVICE BASED AT LEAST IN│
│        PART ON THE PROXIMITY OF THE MOBILE DEVICE        │
│                          608                             │
└─────────────────────────────────────────────────────────┘
                            │
                            ▼
┌─────────────────────────────────────────────────────────┐
│  THE COMPUTING DEVICE SENDS AN INSTRUCTION TO THE MOBILE │
│  DEVICE TO ROUTE THE MOBILE DEVICE TO THE CANDIDATE NODE │
│                          610                             │
└─────────────────────────────────────────────────────────┘
```

FIG. 6

METHODS AND SYSTEMS FOR AUGMENTING NETWORK SITES

BACKGROUND

Various sectors of current wireless networks receive many requests for very high data throughput services. The telemetry data collected by an autonomous vehicle, for example, needs to be offloaded to a cloud storage via the wireless network when the local storage space of the autonomous vehicle is nearly full. In other circumstances, delivery vehicles rely on map data to navigate through an area to multiple destinations. Quite often, the delivery vehicles need to check the real-time map data at one stop to determine the routes to the subsequent stops. Offloading the telemetry data from the autonomous vehicle to the cloud storage and/or downloading the real-time map data greatly challenge the capacities of an access point of the wireless network, typically, a base station of the wireless network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 illustrates an example process, in which a computing device augments the capacities of one or more nodes of the wireless network to provide data service.

DETAILED DESCRIPTION

Figure 1:
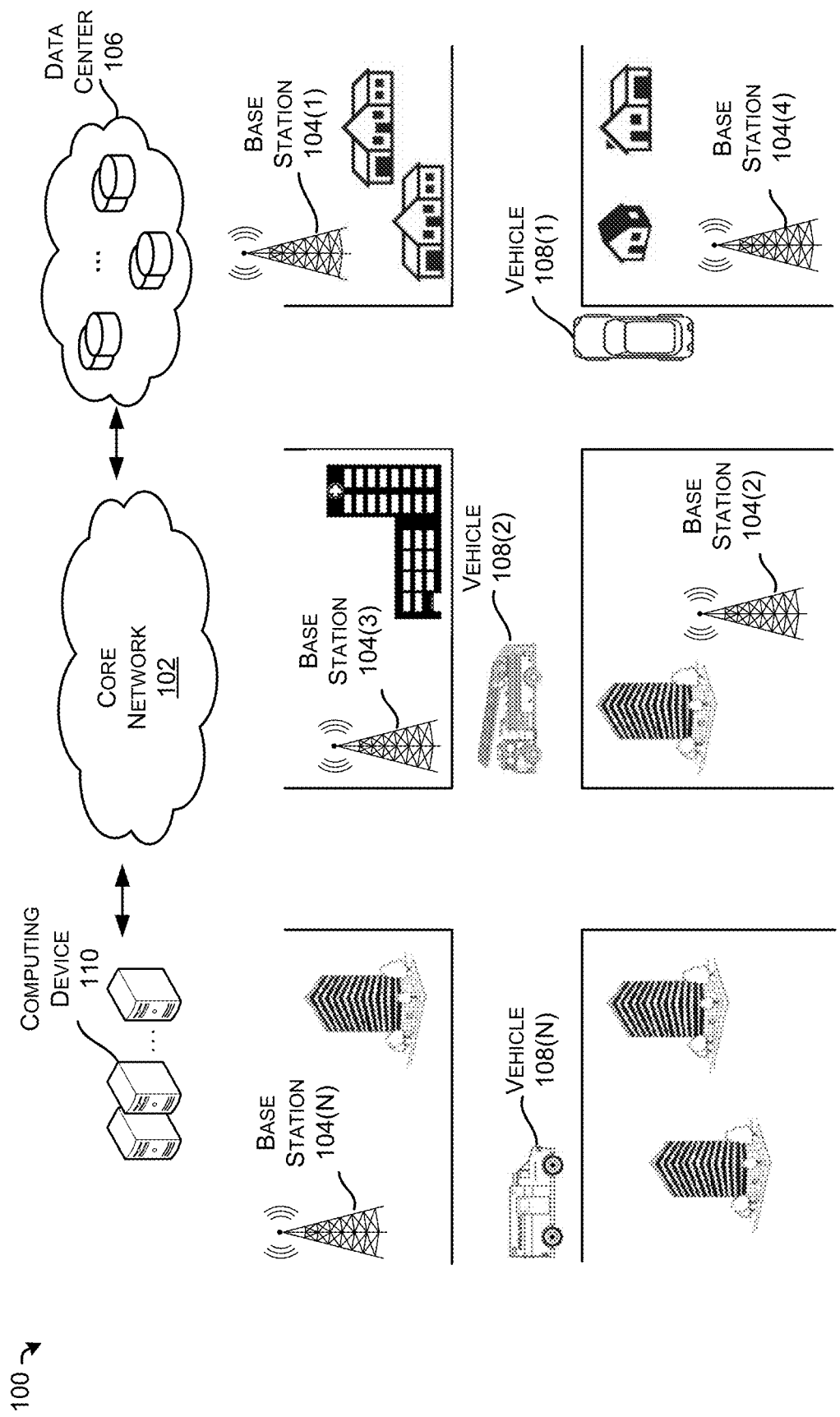
FIG. 1 shows an example network environment, in which one or more base stations are configured to provide wireless services to an area.

Techniques for augmenting the wireless base stations and providing high throughput data services via the augmented base stations are discussed herein. In some examples, a method for augmenting the wireless base stations may include monitoring the operations of the base stations in a wireless network, determining that one or more base stations constantly receive data service requests associated with throughputs that meet or exceed a threshold level, and configuring the one or more base stations to have augmented capacities, such as maximum radio frequency (RF) capacity, a fiber backhaul capacity, or an edge computing capacity. In some implementations, the one or more base stations may be configured with millimeter-wave (mmWave) spectrum. The one or more base station with augmented capacities may be also referred to as data stations to process high throughput data service requests.

In some implementations, a method for providing high throughput data services via the augmented base stations may include receiving, from a vehicle, a request for a high throughput data service, determining, base at least in part on a proximity of the vehicle, one or more candidate data stations to provide the data service, and sending to the vehicle, an instruction that routes the vehicle to the one or more candidate data stations.

In some implementations, the instruction with information related to the one or more candidate data stations may be presented via an application installed on the vehicle, for example, a map application or a navigation application. The information related to the one or more candidate data stations may be visualized on a digital map and the method further provides the instruction to route the vehicle to the one or more candidate data stations via the map application or the navigation application.

In some examples, the information related to all the data stations and the regular base stations (i.e., with no augmented capacities) may be also presented via the map application or the navigation application. During the travel to the one or more candidate data station, if there is an update on the data station and/or the vehicle, the instruction may be updated and the one or more candidate data station on the digital map may be refreshed.

In some implementations, the method may further comprise determining a priority level of the data service and determining the one or more candidate data stations based at least in part on the priority level of the data service. In some examples, a high throughput data service that needs immediate attention may be configured with high priority level while regular offloading of the telemetry data from an autonomous vehicle may be configured with a medium priority level. In other examples, a request from an autonomous vehicle to receive driving instructions based on a large amount of data may be configured with higher priority level than the regular offloading of the telemetry data from the autonomous vehicle.

In some implementations, the base stations may include eNodeB (eNB), gNBs or new radio (NR) base stations. In some implementations, the techniques discussed herein may be implemented in the context of protocols associated with one or more of 3G, 4G, 4G LTE, and/or 5G protocols. In some examples, the network implementations may support standalone architectures, non-standalone architectures, dual connectivity, carrier aggregation, etc. Example implementations are provided below with reference to the following figures.

FIG. 1 shows an example network environment, in which one or more base stations are configured to provide wireless services to an area.

The network environment 100 may include a telecommunication network that comprises a core network 102 and one or more access points linked to the core network 102. The core network 102 and the access points may be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The access points may include one or more base stations 104(1), 104(2), 104(3), 104(4) . . . , 104(N) (where any unspecified base station may be referred to as a base station 104) that communicate with a plurality of user equipment (UE) and the core network 102. In some examples, the base station 104 may be associated with an LTE access network known as an Evolved UMTS Terrestrial Radio Access Network (E-UTRAN). Base stations of the LTE access network can be known as eNBs. In some implementations, the base station 104 may be associated with a 5G access network with base stations known as gNBs or as new radio (NR) base stations. The base station 104 may connect to the core network 102 via various interfaces for transmission of user data and/or control data. The base station 104 is typically configured with certain radio frequency (RF) capacities, computing capacities, and backhaul capacities to support the services within its cell. In an area that is served by the core network 102, some base stations may constantly receive high data throughput requests from the UEs (i.e., the amount of data to be transmitted exceeds 1 GB or some other threshold). In some examples, those base stations that receive high data throughput may be configured with augmented RF capacities, computing capacities, and/or backhaul capacities. Those augmented base stations may serve as "data stations" in the network to accommodate the high throughput services.

The UE may be any device that can wirelessly connect to the telecommunication network. In some examples, the UE 108 may be a mobile phone, such as a smart phone or other cellular phone. In other examples, the UE 108 may be a personal digital assistant (PDA), a media player, a tablet computer, a gaming device, a smart watch, a hotspot, a personal computer (PC) such as a laptop, desktop, or workstation, or any other type of computing or communication device. In some examples, the UE may include the computing devices implemented on the vehicles, e.g., vehicle 108(1), 108(2), . . . , 108(N), etc. (where any unspecified vehicle may be referred to as a vehicle 108). The vehicle may include any types of house-hold vehicles, police cars, autonomous vehicles 108(1), firetrucks 108(2), ambulances 108(N), utility cars/trucks, etc. In some examples, the UE may include the computing devices implemented on other objects, such as robots, drones, wearable devices, wearable materials, etc.

The network environment 100 may also include a computing device 110 and a data center 106 connected to the core network 102. The computing device 110 may be configured to manage the resources associated with the core network 102 including but not limited to, the base station 104 and the data center 106. The computing device 110 may constantly monitor the usage of the resources and re-allocate the resources when needed. The computing device 110 may also process the requests for services from various UEs. In some examples, the computing device 110 may process the requests from the vehicle 108 to offload a huge amount of data to the data center 106. The amount of data that is requested to be offloaded may be in GBs. The computing device 110 may determine one or more augmented base stations (i.e., the data stations) to provide the services to the vehicle 108. In other examples, the vehicle 108 may be an autonomous vehicle or a self-driving vehicle that needs quick instructions on driving based on the captured environment data.

The computing device 110 may be a single computing system or an edge host providing physical or virtual computing resources as known by persons skilled in the art. It should be appreciated that the computing device 110, as illustrated, is merely an example device and is not intended to suggest any limitation as to the scope of use or functionality of any computing device utilized to perform the processes described herein. Other well-known computing devices, systems, environments and/or configurations that may be suitable for use with the examples described herein include, but are not limited to, personal computers, server computers, hand-held or laptop devices, multiprocessor systems, microprocessor-based systems, network PCs, mainframe computers, distributed computing environments, etc.

The data center 106 may be a cloud storage that are associated with a plurality of physical storages located at one or more locations. The plurality of physical storages may span a plurality of servers, which sometimes are located in multiple locations. The physical storages are typically owned and managed by a hosting company. A cloud storage provider of the data center 106 is responsible for securing the data stored therein and keeping the data accessible via the network. The cloud storage services may be accessible through a cloud computing service, a web service application programming interface (API) or by applications that utilize the API, such as cloud desktop storage, a cloud storage gateway or a Web-based content management system.

The example environment illustrated in FIG. 1 shows that an autonomous vehicle 108(1) travels around the area to continuously collect telemetry data and/or lidar data. When the local storage of the autonomous vehicle 108(1) meets or exceeds a threshold, for example, 85% of the local storage, the computing device of the autonomous vehicle 108(1) may send a request to the computing device 110 to offload the data. The computing device of the autonomous vehicle 108(1) may also analyze the collected data (i.e., telemetry data and/or lidar data) and determine whether there is a need to upload the collected data for immediate attention. For example, if the sensors of the autonomous vehicle 108(1) capture images/videos related to a street gunshot, the computing device of the autonomous vehicle 108(1) may send an urgent request to a cloud server to upload the captured data for further analysis. In some examples, the data that needs immediate attention may be processed by a nearby data station so that a quick action can be taken. In some examples, when a firetruck 108(2) is in service, there may be an urgent need for data downloading/uploading for a period of time to determine the fire situation. In other examples, an ambulance 108(N) may need urgent data downloading/uploading to determine the patient's health condition by a remote doctor. Such urgent requests may be transmitted to the computing device 110 with a priority level. The computing device 110 may allocate an augmented base station (i.e., data station) to the firetruck 108(2) or the ambulance 108(N) based on the priority level and the location of the vehicles that request for the data services.

It should be appreciated that the example environment 100 is merely for the illustration purpose. The present disclosure is not intended to be limiting. The example environment 100 may be deployed with a different number of base stations at various locations. Although the vehicle 108 is illustrated as an example of UE, other types of UE that travels around the area may also need data services through the base stations and/or the augmented base stations.

Figure 2:
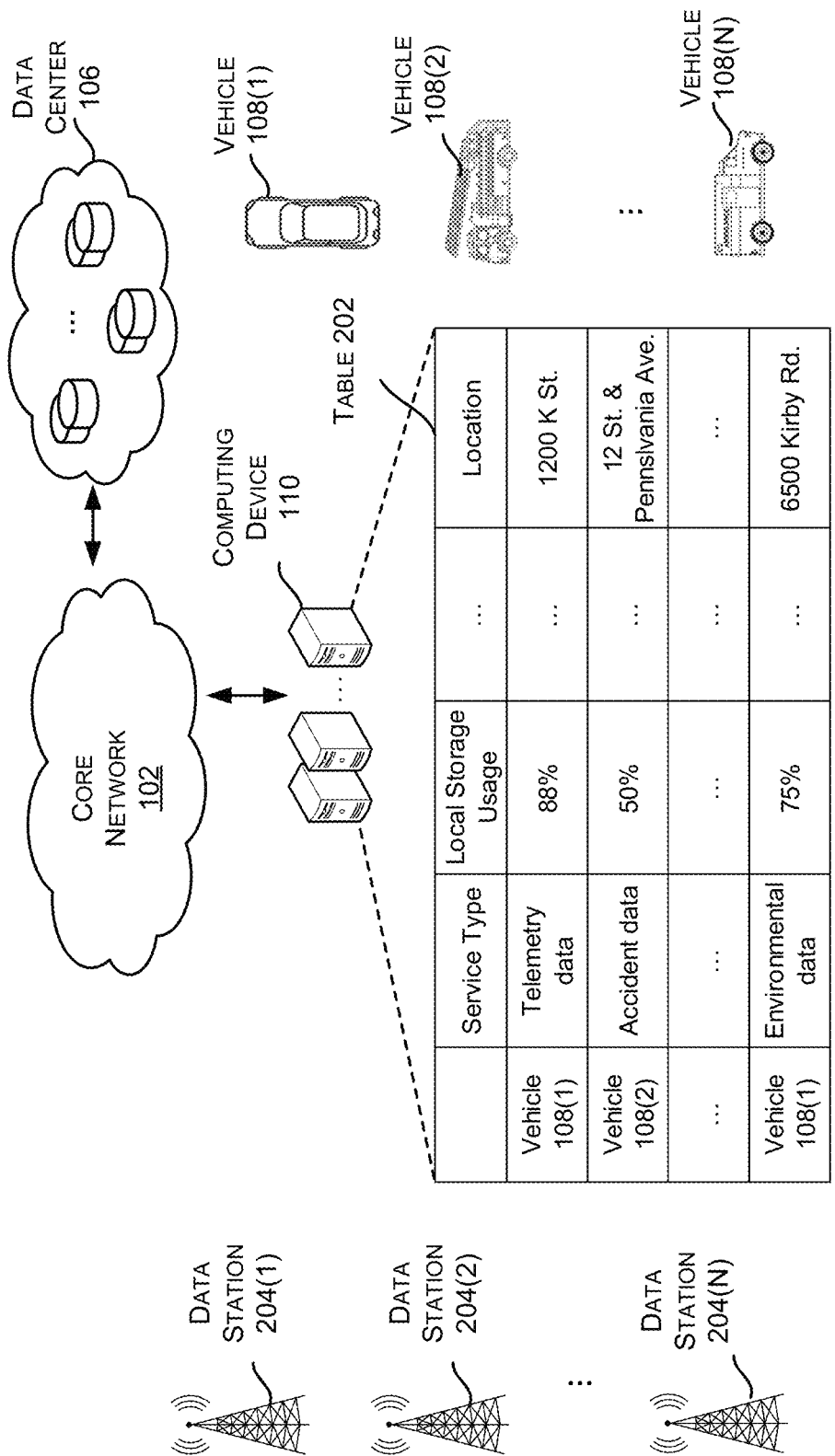
FIG. 2 shows another example network environment, in which a computing device analyzes the data service requests from a plurality of mobile devices.

FIG. 2 shows another example network environment, in which a computing device analyzes the data service requests from a plurality of mobile devices.

The network environment 200 may include similar elements of the network environment 100 in FIG. 1, i.e., the core network 102, the computing device 110, and the data center 106. The network environment 200 may also include one or more data stations 204(1), 204(2), . . . , 204(N) (where any unspecified data stations may be referred to as a data station 204). The data station 204 may have similar configurations as the base station 104 illustrated in FIG. 1. The data station 204, however, may be further configured with enhanced capacities. For example, the data station 204 may be configured with maximum RF capacity covering millimeter wave (mmWave) spectrum. In another example, the data station 204 may be configured with a fiber backhaul to connect to the core network 102. In yet another example, the data station 204 may be configured with edge computing capacity. In implementations, the data station 204 may have augmented capacities in one or more of the RF capacity, the backhaul capacity, or the computing capacity.

The computing device 110 may deploy and maintain the network facilities, i.e., the backhaul capacity of the core network 102, the computing capacity of the data station 204, the storage capacity of the base station 204, etc. In other examples, the computing device 110 may monitor the performance of the network facilities, i.e., the backhaul capacity usage of the core network 102, the scheduling information of the data station 204 (i.e., a number of scheduled tasks in response to the data offloading requests, an amount of data scheduled to be offloaded to the cloud storage, etc.), the usage of the storage space of the data station 204, etc. In other examples, the computing device 110 may monitor the signal coverage of the data station 204 and determine whether an outage occurs in any of the service areas. The monitoring of the signal coverage may be automatically performed in a preset time period and/or performed in real-time.

The computing device 110 may maintain a Table 202 to denote information related to the data service requests sent by various UEs, for example, the vehicle 108. The information denoted in Table 202 may include a service type requested by the vehicle 108. An autonomous vehicle 108(1) may send the request indicating the service type to be offloading the telemetry data or the environmental data. A firetruck 108(2) may send the request indicating the service type to be offloading the accident data. The information denoted in Table 202 may also include a local storage usage level. For example, the autonomous vehicle 108(1) may send the request indicating the service type to be offloading the telemetry data and the local storage usage is 88% of the local storage space. In another example, the autonomous vehicle 108(1) may send the request indicating the service type to be offloading the environmental data and the local storage usage is 75% of the local storage space. In yet another example, the firetruck 108(2) may send the request indicating the service type to be offloading the accident data and the local storage usage is 50% of the local storage space.

It should be appreciated that the information described in connection with the Table 202 is merely for illustration purposes. The present disclosure is not intended to be limiting. In implementations, the information denoted in Table 202 may also indicate a priority level of the service being requested (not shown). For example, if the environment data includes images/videos related to a robbery, regardless the local storage usage, the autonomous vehicle 108(1) may send the request indicating a high priority level. In other implementations, the information denoted in Table 202 may also include a location of the vehicle 108. The computing device 110 may determine a candidate data station based at least in part on the information denoted in Table 202. In yet another example, the information denoted in Table 202 may also include the amount of data to be offloaded from the vehicle 108.

Figure 3:
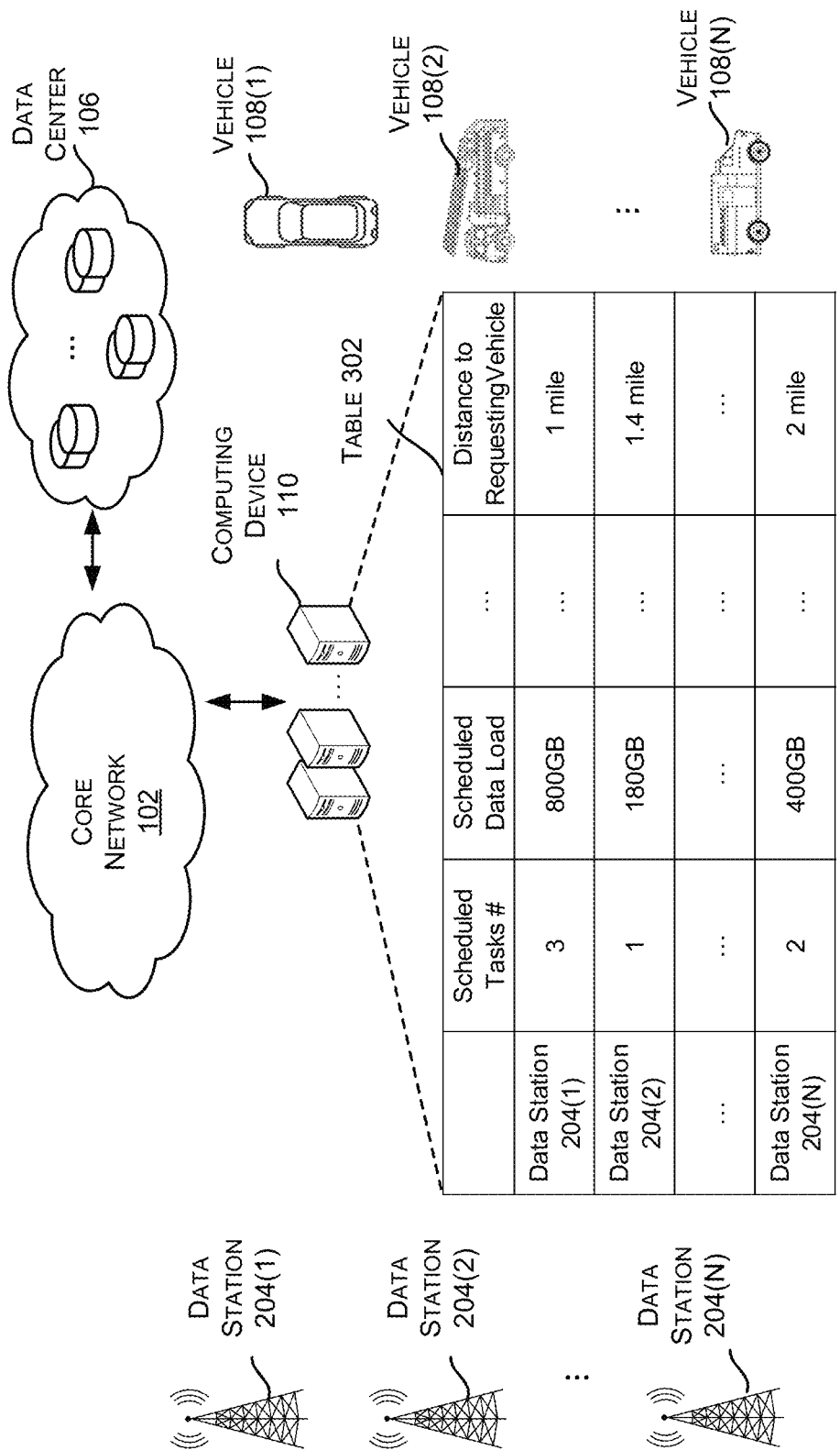
FIG. 3 shows another example network environment, in which a computing device determines the data station to provide the data service according to the request.

FIG. 3 shows another example network environment, in which a computing device determines the data station to provide the data service according to the request.

The network environment 300 may include similar elements of the network environment 200 in FIG. 2, i.e., the core network 102, the computing device 110, the data center 106, and the data station 204. In addition to maintaining the Table 202, as illustrated in FIG. 2, the computing device 110 may also maintain a Table 302 to denote the information related to the data station 204 and the data service request. The information in Table 302 may indicate a current workload of the data station 204. In examples, the current workload of the data station 204 may be represented by a number of scheduled tasks. In other examples, the current workload of the data station 204 may be represented by scheduled data load in GB. In other examples, the current workload of the data station 204 may be presented by the CPU usage, the wireless channel usage, etc. As shown in Table 302, the data station 204(1) has three scheduled tasks and a total data load scheduled to be transmitted is 800 GB while the data station 204(2) has one scheduled task and a total data load scheduled to be transmitted is 180 GB. The information in Table 302 may also include a distance between the data station 204 and the requesting vehicle. Such information may be determined based on the location information of the vehicles indicated in the Table 202.

It should be appreciated that the Table 302 of FIG. 3 is merely for illustrative purposes. The present disclosure is not intended to be limiting. The computing device 110 may include other information related to the status of the data station 204. For example, the computing device 110 may also include an availability status of the data station 204. When a data station is in service, the Table 302 may denote the data station as "on" status, while when the data station is out of service, the Table 302 may denote the data station as "off" status.

As discussed herein, the base station 104 associated with the core network 102 includes not only the augmented base stations (i.e., the data station 204) but also the base stations with normal configuration. The computing device 110 also monitors the operations of the base stations with normal configuration. The computing device 110 may include information related to the base stations with normal configuration in the Table 302. Alternatively, the computing device 110 may maintain a separate table to denote the information related to the base stations with normal configuration. As the information in the Table 202 and the Table 302 is at least partially correlated, the computing device 110 may maintain a single table to manage the network resources and the data service requests sent by various UEs. The information in the Table 202 and/or the Table 302 may be updated in a certain period of time. Alternatively or additionally, the information in the Table 202 and/or the Table 302 may be updated upon a data service request is received.

Figure 4:
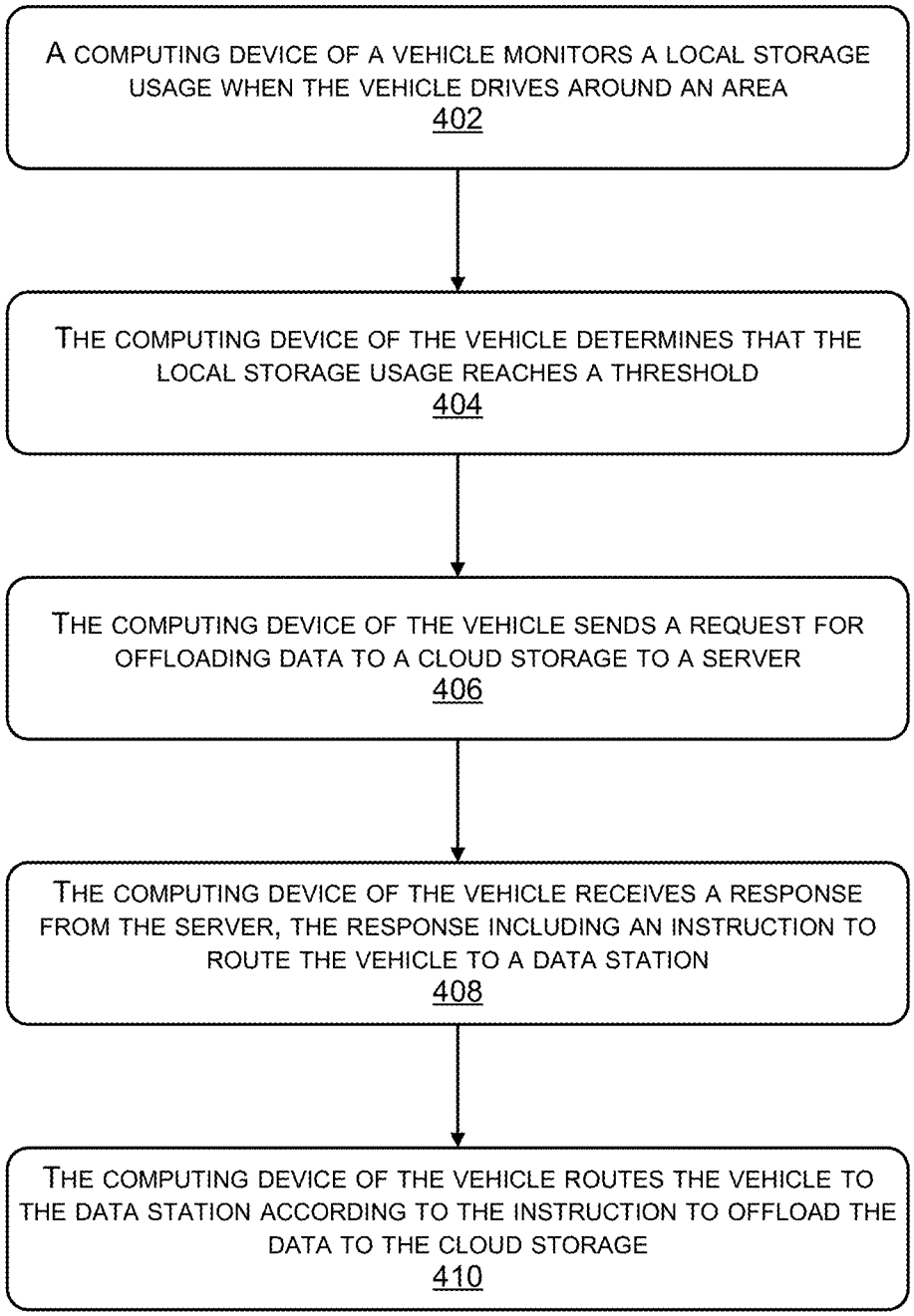
FIG. 4 illustrates an example process, in which a computing device of a vehicle communicates with a server to receive the data service.

FIG. 4 illustrates an example process, in which a computing device of a vehicle communicates with a server to receive the data service. The example process 400 may be performed by the computing device of the vehicle 108, as illustrated in FIGS. 1-3.

At operation 402, a computing device of a vehicle monitors a local storage usage when the vehicle drives around an area. As discussed herein, the vehicle may be an autonomous vehicle or self-driving vehicle that drives around the area to constantly collect telemetry data and/or lidar data. The collected telemetry data and/or lidar data is automatically stored in the local storage of the autonomous vehicle. In some examples, the vehicle may be delivery vehicle that delivers the parcels to multiple locations in the area. The local storage of the delivery vehicle may store information related to the area map and the multiple locations. The computing device of the delivery vehicle plans the delivery route based on the area map and adjusts the delivery route according to some events and/or accidents in the area. Thus, the local storage of the delivery vehicle may need to be updated periodically and/or at each stop in the delivery route.

At operation 404, the computing device of the vehicle determines that the local storage usage reaches a threshold. In implementations, the computing device of the vehicle may set a threshold as a certain percentage of the local storage, for example, 75% of the total local storage space. When the local storage usage meets or exceeds the threshold, the computing device of the vehicle determines that the data needs to be offloaded from the local storage.

At operation 406, the computing device of the vehicle sends a request for offloading data to a cloud storage to a server. In implementations, the computing device of the vehicle may send a request via an application installed thereon. For example, an autonomous vehicle may be configured with a data collection application that cooperates with various sensors (i.e., imaging sensors, thermal sensors, lidar sensors, etc.) of the autonomous vehicle to collect the real-time data. The data collection application simultaneously writes the collected data into the local storage of the autonomous vehicle. The computing device of the autonomous vehicle monitors the usage of the local storage and sends a request via the data collection application once the usage of the local storage reaches a threshold.

In implementations, the request for offloading data may include the type of data to be offloaded, the amount of data to be offloaded, the usage of the local storage of the autonomous vehicle, the location of the autonomous vehicle, the priority level of the request, etc. In some examples, the request for offloading data may also include the battery level or other parameters associated with the autonomous vehicles.

In another example, the autonomous vehicle may need immediate assistant in determining which road to take. The autonomous vehicle may need to offload the collected data for a quick analysis. The autonomous vehicle may send a request to the server for a quick offloading of the data in a nearby data station.

In another example, a delivery vehicle may be configured with a navigation application. The navigation application may pre-plan the delivery route to multiple locations based on the local stored map. However, as the real-time traffic in the area varies, the delivery vehicle may need to check the traffic status and/or streets closure information from time to time during the delivery. For example, the delivery vehicle may send a request to download the map data to check the traffic information at a stop and determine whether the pre-planned delivery route needs to be adjusted.

In implementations, the request to download the map data may include a pre-set time period, during which, the traffic update is desired. The request to download the map data may also include instructions to download only street closures caused by significant traffic jam. In some examples, the request to download the map data may further include an instruction to receive the adjusted delivery route based on the real-time traffic.

In other examples, a firetruck or a utility vehicle may also need to transmit the collected data to a backend server to process. As the collected data is generally related to some emergency situation (i.e., fire emergency, gas pipeline breakage, etc.), it is important to upload the data for analysis and making quick actions. In yet another example, am ambulance may need to transmit the data related to a patient in urgent medical attention. The priority levels of the requests sent by those types of vehicles may be set high, regardless of the amount of data to be uploaded/downloaded and/or the usage of the local storage of the vehicles. In some circumstances, the priority level may override those of the autonomous vehicle or the delivery vehicle.

At operation 408, the computing device of the vehicle receives a response from the server, the response including an instruction to route the vehicle to a data station. The server may refer to the computing device 110 connected to the core network 102. As discussed herein, the server is configured to monitor the operation status of the base stations 104 including one or more augmented base station (i.e., the data station 204 in FIG. 2). The server may determine a candidate data station that is capable to accommodate the data uploading/downloading request. The server sends a response including at least information related to the candidate data station to the computing device of the vehicle. In implementations, the receipt of the response may trigger a launch of a navigation application installed on the computing device of the vehicle. The information in the response may be loaded to the navigation application. For example, the receipt of the response may launch the navigation application, load the location of the candidate data station to the map, and provide an instruction to route the vehicle to the candidate data station.

At operation 410, the computing device of the vehicle routes the vehicle to the data station according to the instruction to offload the data to the cloud storage. The computing device of the vehicle may route the vehicles via the navigation application according to the instructions. In some examples, the response from the server may include the information of all available data stations. The information of all available data stations may be loaded to the navigation application. When there are any changes in the route to the preferred data station, the computing device of the vehicle may re-route the vehicle to another available data station via the navigation application.

Figure 5:
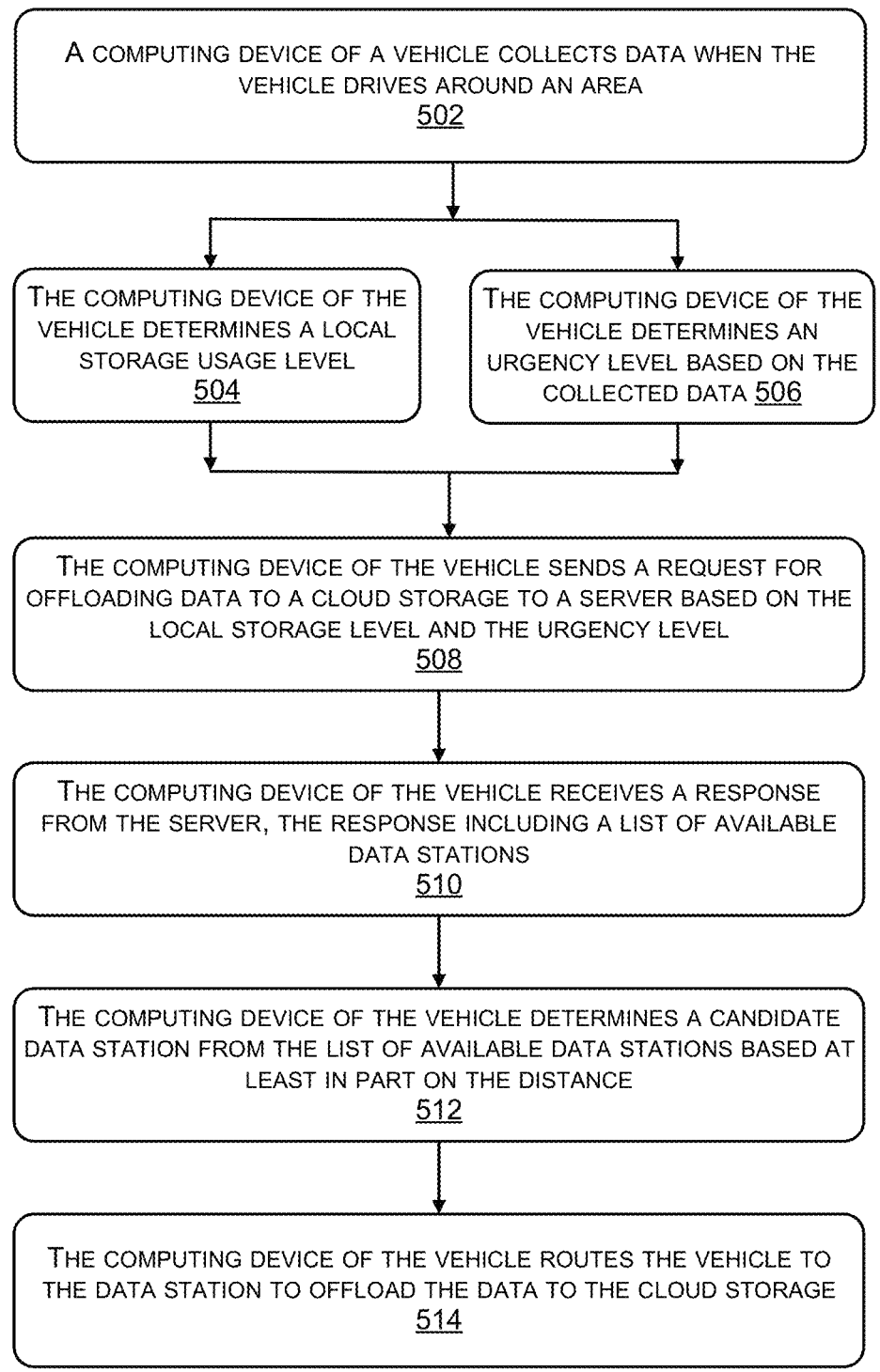
FIG. 5 illustrates another example process, in which a computing device of a vehicle communicates with a server to receive the data service.

FIG. 5 illustrates another example process, in which a computing device of a vehicle communicates with a server to receive the data service. The example process 500 may be performed by the computing device of the vehicle 108, as illustrated in FIGS. 1-3.

At operation 502, a computing device of a vehicle collects data when the vehicle drives around an area. As discussed herein, the vehicle nowadays is configured with certain levels of computing, communicating, and storing capacities. An autonomous vehicle may be used to collect environmental data for the navigation application and/or for the business development purposes. For example, Google may use the collected data for the development of Google Map application. Chewy may use the collected data to determine a new store location based on the spotted pet distribution in the collected data. In examples, a delivery vehicle, a firetruck, a utility truck, an ambulance, etc., may have sporadic needs to collect a huge amount of data in a short period of time. The computing device of the vehicle may collect the images using a Lidar sensor. In some examples, the computing device of the vehicle may collect the images using pixel cameras based on light sensitivity techniques. In yet other examples, the computing device of the vehicle may collect the images using a thermal sensor. The computing device of the vehicle may collect the images using one or more sensors in different imaging techniques. The present disclosure is not intended to be limiting.

At operation 504, the computing device of the vehicle determines a local storage usage level. The operation 504 is similar to those described in connection with operation 404 and is not detailed herein.

At operation 506, the computing device of the vehicle determines a priority level based on the collected data. As discussed herein, while an autonomous vehicle may need to offload the collected data from time to time at a regular basis, a firetruck or an ambulance may need to transmit a large throughout data in a short period of time. In some circumstances, the autonomous vehicle may accidently capture the images that may be helpful in a short period of time. For example, the autonomous vehicle may capture the images related to a car accident or a gunshot during its navigation. Such information is useful for the police station and/or the fire station to take immediate actions. The computing device of the vehicle may analyze the collected data to determine a priority level for the data service. In some examples, the computing device of the autonomous vehicle may set the priority level as medium for the regular data offloading service. In another example, the computing device of the autonomous vehicle may set the priority level as high for uploading accident or gunshot related image data.

In implementations, the priority level may be determined based on other factors. The present disclosure is not intended to be limiting. For example, the priority level may be determined based on the usage of the local storage, the battery and/or gas tank level, the condition of the vehicle, or any combination thereof.

At operation 508, the computing device of the vehicle sends a request for offloading data to a cloud storage to a server based on the local storage level and the priority level. As discussed herein, the request for offloading data may include various information such as the local storage level, the priority level, the amount of data to be offloaded, the current location of the vehicle, etc.

At operation 510, the computing device of the vehicle receives a response from the server, the response including a list of available data stations. In implementations, the list of available data stations may be presented via an application installed on the vehicle, for example, a navigation application. The computing device of the vehicle can visualize the distances between its location and the list of available data stations on the navigation application. In some examples, the response from the server may also include a queue of data services that are scheduled by the individual data station. In other examples, the response from the server may indicate one or more configured capacities of the individual data station, i.e., the RF capacity, the backhaul capacity, or the computing capacity.

At operation 512, the computing device of the vehicle determines a candidate data station from the list of available data stations based at least in part on the distance. In some examples, the computing device of the vehicle may select a candidate data station that is in closest proximity to its location. In other examples, the computing device of the vehicle may select a candidate data station that has a shortest queue of data services. In other examples, the computing device of the vehicle may select a candidate data station that is configured with a maximum RF capacity, a maximum backhaul capacity, or an edge computing capacity.

At operation 514, the computing device of the vehicle routes the vehicle to the candidate data station to offload the data to the cloud storage. As discussed herein, the computing device of the vehicle may route the vehicle to the candidate data station via a navigation application. The information of the list of available data stations may be loaded to the navigation application. For example, the locations of the available data stations are visualized in a digital map of the navigation application. When there are any changes to the route to the candidate data station, the computing device of the vehicle may automatically select another available data station and update the route.

FIG. 6 illustrates an example process, in which a computing device augments the capacities of one or more nodes of the wireless network to provide data service. The example process 500 may be performed by the computing device 110 connected to the core network 102, as illustrated in FIGS. 1-3.

At operation 602, a computing device determines a set of nodes that provide wireless services to an area. The set of nodes may include base stations in the wireless communication network such as, eNodeB (eNB), gNBs or new radio (NR) base stations. The computing device may be configured to manage the wireless network resources, monitor the operations of various network facilities, and respond to different types of service requests from UEs. Based on the operations of the network facilities, the computing device may discover the patterns of data throughput in the wireless network. Certain base stations may quite often receive high throughput data transmission requests while other base stations may operate at low capacity requirement most of the time. To accommodate such high throughput data transmission requests, the computing device may determine one or more base stations that experience high data throughput frequently and augment these base stations to have more capacities. These base stations may be configured as data stations (i.e., the data station 204 in FIGS. 2-3) for the vehicles to exchange data with a cloud storage. For example, a base station that receives high throughput data transmission requests over 50% of the normal workday hours may be determined as a potential data station. In other examples, a base station that often receives the amount over 1 GB data transmission requests may be determined as a potential data station.

At operation 604, the computing device augments one or more capacities of the set of nodes, the one or more capacities including at least one of a radio frequency (RF) capacity, a backhaul capacity, or a computing capacity. The base stations of a wireless communication network (i.e., 2G/3G/4G LTE/5G) are typically configured with a certain RF spectrum, a backhaul bandwidth to connect to the core network, and certain computing capabilities. For example, 4G network uses about 700 MHz-2500 MHz frequency to transfer information while 5G network. 5G network's RF spectrum is in the sub-6 GHz frequency range and the millimeter-wave (mmWave) frequency range (i.e., approximately 24.25 GHz and above). In implementations, the computing device may configure at least one of the set of nodes with the mmWave frequency range.

The backhaul provides intermediate links between the core network (i.e., the core network 102 shown in FIGS. 1-3) and a cell site at the edge of the network. The backhaul technologies can largely be categorized into wired (leased lines or copper/fiber) or wireless (point-to-point, point-to-multipoint over high-capacity radio links). Common backhaul technologies include but are but not limited to, free-space optical (FSO), point-to-point microwave radio relay transmission, point-to-multipoint microwave-access technologies, such as local multipoint distribution service (LMDS), Wi-Fi, WiMAX, etc., digital subscriber line (DSL)

variants, such as asymmetric DSL (ADSL), very high-speed DSL (VDSL) and single-pair high-speed DSL (SHDSL), plesiochronous digital hierarchy (PDH) and synchronous optical networking (SONET) and synchronous digital hierarchy (SDH) interfaces, Ethernet, VoIP telephony over dedicated and public IP networks, etc. In some implementations, Wi-Fi mesh networks may also be used for wireless backhaul. In implementations, the computing device may configure at least one of the set of nodes with a fiber backhaul.

In the 2G/3G/4G networks, the data is quite often uploaded and processed at a central cloud server. However, the autonomous vehicles or the self-driving vehicles need a huge amount of processed data in a short period of time. For example, the autonomous vehicle cannot wait for the data to be processed at the central cloud server to determine which lane to take. Thus, in implementations, the computing device may configure at least one of the set of nodes with edge computing capacity such that data can be analyzed and processed at a base station near the UEs.

In implementations, the set of nodes may be configured with the same augmented parameters. In other implementations, one or more of the set of nodes may be configured differently from the rest of the nodes.

At operation 606, the computing device receives a request for data service from a mobile device. As discussed herein, the request for data service may include a type of mobile device, a type of the data service, an amount of data that needs to be transmitted via the network, a desired data transmission speed, a priority level of the data service, a location of the mobile device, etc. The mobile device may include but not limited to a smart phone, a personal digital assistant (PDA), a media player, a tablet computer, a gaming device, a smart watch, a hotspot, a personal computer (PC) such as a laptop, desktop, or workstation, or any other type of computing or communication device. In some examples, the computing device may be implemented on the vehicles, such as vehicle 108, as illustrated in FIGS. 1-3.

In implementations, the type of the data service may include offloading the data in a local storage, downloading the up-to-date map data, uploading images related to emergencies, etc. The request for data service may also include an amount of data to be transmitted with a desired data transmission speed. The request for data service may also include a priority level of the data service. It should be appreciated that the information conveyed by the request for data service may be generated by the individual mobile devices. The computing device may further analyze such information to determine a candidate data station for the individual mobile devices.

At operation 608, the computing device determines a candidate node from the set of nodes to provide the data service based on at least in part on the proximity of the mobile device. As discussed herein, the computing device may select a candidate data station that is closest to the requesting mobile device to provide the data service. In some examples, the computing device may select one or more candidate data stations based on the distances between the requesting mobile device and the data stations.

In implementations, the computing device may combine other factors to determine the candidate data stations, such as the capacities of the data stations, the queued data service requests at the individual data stations, the priority level of the requested data service, etc.

At operation 610, the computing device sends an instruction to the mobile device to route the mobile device to the candidate node. As discussed herein, the instruction may include the location information of the candidate data station. In some examples, the instruction may also include a list of candidate data stations and the location information associated therewith. In implementations, the information conveyed by the instruction may be presented via an application installed on the mobile device. For example, the list of candidate data stations may be visualized in a navigation application, such as Google Maps, Garmin Maps, etc.

Figure 7:
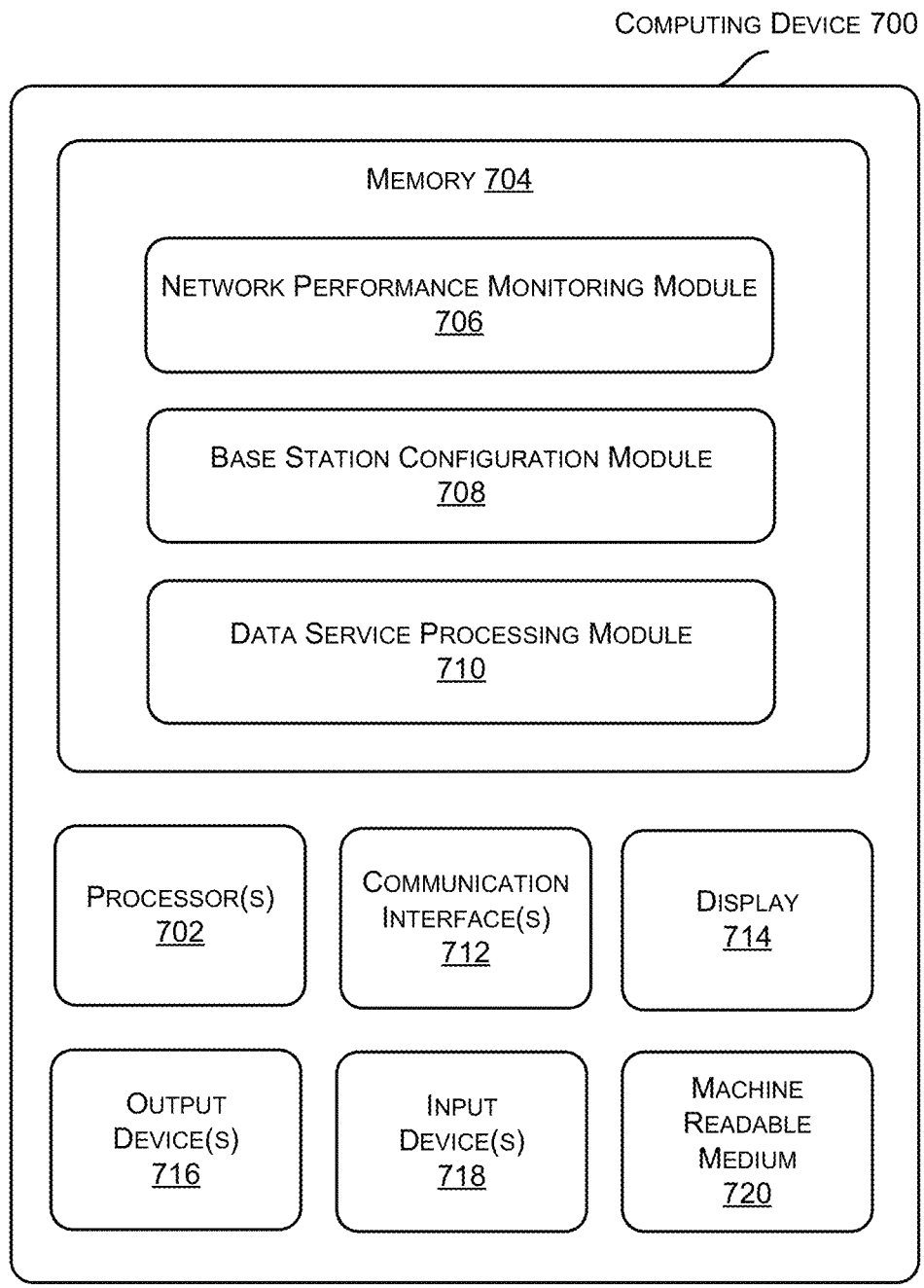
FIG. 7 illustrates a block diagram of a computing device implementing the process described above.

FIG. 7 illustrates a block diagram of a computing device implementing the process described above. As shown, a computing device 700 may comprise process(s) 702, memory 704 that stores a network performance monitoring module 706, a base station configuration module 708, and a data service processing module 710, communication interface(s) 712, a display 714, output device(s) 716, input device(s) 718, and a machine readable medium 720.

The processor(s) 702 may be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in the memory 704, which can be associated with common types of volatile (RAM) and/or nonvolatile (ROM) memory.

The memory 704 may include system memory, which may be volatile (such as RAM), non-volatile (such as ROM, flash memory, etc.) or some combination of the two. The memory 704 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information.

The network performance monitoring module 706 may be configured to monitor the operations of the network facilities including but not limited to, the operation status of the base stations, the backhaul usage of the network, the frequency spectrum usage of individual base stations, etc. The network performance monitoring module 706 may also analyze the data throughput across the network in real-time and/or in a preset time period and determine that some base stations constantly receive high throughput requests. The network performance monitoring module 706 may provide a network performance report to the base station configuration module 708.

The base station configuration module 708 may be configured to set the parameters associated with the base stations. The base stations may be initially configured with a same set of parameters. Based on the network performance report, especially, the data throughput distributions among the base stations, the base station configuration module 708 may set one or more base stations differently from others. For the base stations that constantly receive high throughput requests, the base station configuration module 708 may configure them with augmented capacities to accommodate such requests. Such base stations may also be referred to as data stations with enhanced RF capacities and/or backhaul capacities for the UE to offload the high throughput data to the cloud storage. In some examples, the data stations may provide edge computing capacity to quickly analyze the large amount of data locally and provide instructions to UE. The operations that the base station configuration module 708 performs are described above in connection with FIG. 6.

The data service processing module 710 may be configured to process a data service request from UE. The data service request may refer to high throughput data transmission between the UE and the central cloud server and/or a cloud storage. The data service processing module 710 may select at least one data station to provide the high throughput data service. The data service processing module 710 may consider various factors including but not limited to, the urgency of the data service, the amount of data to be transmitted and the desire speed, the proximity of the requesting UE to the data stations, the scheduling information of the data stations, etc. The operations that the data service processing module 710 performs are described above in connection with FIG. 6.

The communication interface(s) 712 may include transceivers, modems, interfaces, antennas, and/or other components that perform or assist in exchanging radio frequency (RF) communications with UE(s) of the telecommunication network, other Wi-Fi access point, and/or otherwise implement connections with one or more networks. For example, the communication interfaces 712 may be compatible with multiple radio access technologies, such as 5G radio access technologies and 4G/LTE radio access technologies. The communication interfaces 712 may be configured to allow the computing device 700 to exchange data with various resources including but not limited to, base stations, UE(s), cloud server, cloud storage, etc.

The display 714 may be a liquid crystal display or any other type of display commonly used in any computing devices. For example, display 714 may be a touch-sensitive display screen, and can then also act as an input device or keypad, such as for providing a soft-key keyboard, navigation buttons, or any other type of input. The output device(s) 716 may include any sort of output devices known in the art, such as the display 714, speakers, a vibrating mechanism, and/or a tactile feedback mechanism. The output device(s) 716 may also include ports for one or more peripheral devices, such as headphones, peripheral speakers, and/or a peripheral display. The input device(s) 718 may include any sort of input devices known in the art. For example, the input device(s) 718 may include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 may store one or more sets of instructions, such as software or firmware, that embodies any one or more of the methodologies or functions described herein. The instructions may also reside, completely or at least partially, within the memory 704, the processor(s) 702, and/or the communication interface(s) 712 during execution thereof by the computing device 700. The memory 704 and the processor(s) 702 may can constitute machine readable media 720.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   determining a set of nodes providing wireless services, wherein the nodes of the set of nodes are data stations having one or more augmented capacities for data transfer;
   receiving, from a vehicle, a request for a data service associated with a throughput that meets or exceeds a threshold level, wherein the request for the data service is a request to offload telemetry or receive driving instructions;
   analyzing, by the vehicle, data collected by one or more sensors of the vehicle;

determining a priority level of the data service based on at least a portion of the collected data that is associated with the data service;

determining, based at least in part on a proximity of the vehicle and the priority level, at least one candidate node from the set of nodes; and sending, to the vehicle, an instruction to route the vehicle to the at least one candidate node to receive the data service, wherein the instruction includes location information of the candidate node.

2. The method of claim 1, wherein the one or more augmented capacities include at least one of a radio frequency (RF) capacity, a backhaul capacity, or a computing capacity.

3. The method of claim 2, wherein the one or more augmented capacities include
an edge computing capacity.

4. The method of claim 2, wherein the one or more augmented capacities include
a capacity to use a millimeter-wave (mmWave) spectrum.

5. The method of claim 2, wherein the one or more augmented capacities include
a fiber backhaul.

6. The method of claim 1, further comprising:
obtaining scheduling information of the set of nodes; and
determining, based at least in part on the scheduling information, the at least one candidate node from the set of nodes.

7. The method of claim 1, further comprising:
implementing information related to the set of nodes in a map application of the vehicle; and
navigating, via the map application, the vehicle to the at least one candidate node according to the instruction.

8. A system comprising:
a processor, and
a memory storing instructions executed by the processor to perform operations including:
determining a set of nodes providing wireless services, wherein the nodes of the set of nodes are data stations having one or more augmented capacities for data transfer;
receiving, from a vehicle, a request for a data service associated with a throughput that meets or exceeds a threshold level, wherein the request for the data service is a request to offload telemetry or receive driving instructions;
analyzing, by the vehicle, data collected by one or more sensors of the vehicle;
determining a priority level of the data service based on at least a portion of the collected data that is associated with the data service;
determining, based at least in part on a proximity of the vehicle and the priority level, at least one candidate node from the set of nodes; and
sending, to the vehicle, an instruction to route the vehicle to the at least one candidate node to receive the data service, wherein the instruction includes location information of the candidate node.

9. The system of claim 8, wherein the one or more augmented capacities include at least one of a radio frequency (RF) capacity, a backhaul capacity, or a computing capacity.

10. The system of claim 9, wherein the one or more augmented capacities include
an edge computing capacity.

11. The system of claim 9, wherein the one or more augmented capacities include
a capacity to use a millimeter-wave (mmWave) spectrum.

12. The system of claim 9, wherein the one or more augmented capacities include
a fiber backhaul.

13. The system of claim 8, wherein the operations further comprise:
obtaining scheduling information of the set of nodes; and
determining, based at least in part on the scheduling information, the at least one candidate node from the set of nodes.

14. The system of claim 8, wherein the operations further comprise:
implementing information related to the set of nodes in a map application of the vehicle; and
navigating, via the map application, the vehicle to the at least one candidate node according to the instruction.

15. A non-transitory computer-readable storage medium storing computer-readable instructions, that when executed by a processor, cause the processor to perform actions comprising:
determining a set of nodes providing wireless services, wherein the nodes of the set of nodes are data stations having one or more augmented capacities for data transfer;
receiving, from a vehicle, a request for a data service associated with a throughput that meets or exceeds a threshold level, wherein the request for the data service is a request to offload telemetry or receive driving instructions;
analyzing, by the vehicle, data collected by one or more sensors of the vehicle;
determining a priority level of the data service based on at least a portion of the collected data that is associated with the data service including at least one of telemetry data, environmental data, or image data;
determining, based at least in part on a proximity of the vehicle and the priority level, at least one candidate node from the set of nodes; and
sending, to the vehicle, an instruction to route the vehicle to the at least one candidate node to receive the data service, wherein the instruction includes location information of the candidate node.

16. The non-transitory computer-readable storage medium of claim 15, wherein augmenting the one or more augmented capacities include
an edge computing capacity.

17. The non-transitory computer-readable storage medium of claim 15, wherein the one or more augmented capacities include
a capacity to use a millimeter-wave (mmWave) spectrum.

18. The non-transitory computer-readable storage medium of claim 15, wherein the one or more augmented capacities include
a fiber backhaul.

19. The non-transitory computer-readable storage medium of claim 15, wherein the actions further comprise:
obtaining scheduling information of the set of nodes; and
determining, based at least in part on the scheduling information, the at least one candidate node from the set of nodes.

20. The non-transitory computer-readable storage medium of claim 15, wherein the actions further comprise:
implementing information related to the set of nodes in a map application of the vehicle; and navigating, via the map application, the vehicle to the at least one candidate node according to the instruction.

* * * * *